(12) United States Patent
Devadoss et al.

(10) Patent No.: US 8,429,117 B2
(45) Date of Patent: Apr. 23, 2013

(54) DATA LOADING METHOD FOR A DATA WAREHOUSE

(75) Inventors: Madan Gopal Devadoss, Karnataka (IN); Abhilash R, Karnataka (IN); Panish Ramakrishna, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 83 days.

(21) Appl. No.: 13/026,315

(22) Filed: Feb. 14, 2011

(65) Prior Publication Data

US 2012/0166385 A1 Jun. 28, 2012

(30) Foreign Application Priority Data

Dec. 28, 2010 (IN) .......................... 3976/CHE/2010

(51) Int. Cl.
*G06F 17/30* (2006.01)
*G06F 7/00* (2006.01)

(52) U.S. Cl.
USPC ............................................ 707/600; 707/602

(58) Field of Classification Search ........................ None
See application file for complete search history.

(56) References Cited

U.S. PATENT DOCUMENTS

2009/0055439 A1* 2/2009 Pai et al. ........................ 707/200
2009/0299969 A1* 12/2009 Le ...................................... 707/3
2011/0004622 A1* 1/2011 Marson .......................... 707/770

* cited by examiner

*Primary Examiner* — Sangwoo Ahn (57) ABSTRACT

Provided is a method of loading data in a data warehouse. Two types of work tables are generated, namely, a first work table and a second work table. The data is loaded into the first work table and prepared for loading, using the second work table as temporary table for data preparation. The prepared data is loaded into the data warehouse.

10 Claims, 4 Drawing Sheets

DATA LOADING METHOD FOR A DATA WAREHOUSE

RELATED APPLICATION

Benefit is claimed under 35 U.S.C. 119(a)-(d) to Foreign application Serial No. 3976/CHE/2010, filed in INDIA entitled "DATA LOADING METHOD FOR A DATA WAREHOUSE" by Hewlett-Packard Development Company, L.P., filed on Dec. 28, 2010, which is herein incorporated in its entirety by reference for all purposes.

BACKGROUND

As businesses expand and enterprises grow in nature, the data that an organization needs to manage also grows. Whether it is a small start-up company with limited systems and processes, or a large entity spanning multiple geographies across the world, with hundreds of machines networked together, the need to capture data and store it for future use is omnipresent. Adding to the complexity of dealing with a large amount of data is the difficulty of managing different kinds of data in various formats, which may have originated from a variety of data sources. For example, the data from a human resource system might be very different from the data that may originate in a sales system.

A data warehouse is a repository of data designed to support management decision making. A data warehouse has evolved due to complex requirements that data management requires. It supports the process of moving data from different source systems so that the data could be stored in an integrated manner for future reference. A data warehouse typically supports a wide variety of management reports or data mining models highlighting business conditions that may be present at a particular point in time. It's a repository of an organization's stored and historical data which enables the management to take business decisions.

Considering that data in a data warehouse may come from a variety of sources and in different formats, an efficient data loading mechanism is always desirable.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

A data warehouse acts as a platform for collecting and aggregating content from diverse applications and data sources. Data warehouses generally combine data extracted from many different data sources across an entire enterprise.

Generally, a data warehouse based on a two-layer architecture, consists of four data flow layers.

1) The first layer is called the source layer. Since a data warehouse may obtain data form a variety of data systems. The source layer represents different sources of data.
2) The second layer is the data staging layer. The data obtained form different sources needs to be extracted, cleaned and merged into a common format. These steps are typically known as Extraction, Transformation, and Loading (ETL) steps.
3) The third layer is the data warehouse layer. This typically consists of a data warehouse where the data is stored as a single, organized repository.
4) The fourth layer is the logical layer. This layer is used to analyze the data stored in the data warehouse, to generate reports and dashboards for business decision making.

As mentioned above, ETL consists of three steps. One of the steps is of data loading. After the data has been cleansed and transformed into a structure consistent with the data warehouse requirements, data is ready for loading into a data warehouse. The load phase loads the data into an end target, typically a data warehouse. Data loading is a critical component of data management and may result in serious repercussions if the data is not loaded correctly or completed in a specified time frame. In fact, a data warehouse may not be entirely usable until the data load has been completed. Depending on the requirements of an enterprise, the data loading process may vary widely. For example, loading may take place on daily, weekly or monthly basis. Also, there may be many factors that can have an impact on data loading process. For example, the amount of time required to load data into a data warehouse may impact its performance. Also, another area that could have significant impact on the data load process is the amount of integrity checking that is carried out.

It is also desirable to have a data load mechanism that has the ability to model data load requirements in a database independent manner, to optimize data load in a database dependent and database specific manner for all supported databases, to support loading different types of data to different schema models, and to provide high scalability and extensibility.

Proposed is a solution that mitigates these challenges and provides an efficient and scalable data loading method for a data warehouse. Embodiments of the present solution provide a method, system and computer executable code for data loading in a data warehouse.

Figure 1:
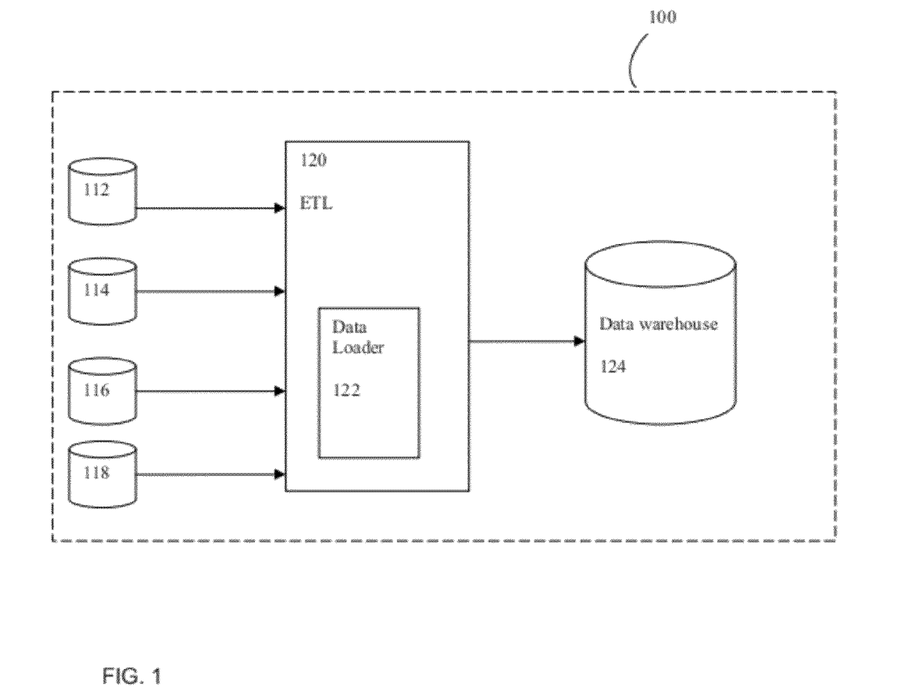
FIG. 1 shows a graphic representation of a top level view of exemplary data warehouse architecture 100 according to an embodiment

FIG. 1 shows a graphic representation of a top level view of exemplary data warehouse architecture 100 according to an embodiment.

Data warehousing is the foundation for data management and involves extracting data from various systems, moving it into data warehouse structures, reorganizing the data for analysis and moving it into reporting structures. A data warehouse (DW) architecture is based on a number of factors. Some of these factors include: business processes within an enterprise, data structure, security, data modeling and organization, query requirements, meta data management, analytics and reporting requirements, etc.

Referring to FIG. 1, the data warehouse architecture 100 includes data sources 112, 114, 116 and 118, a data staging layer 120 and a data warehouse 124.

The data staging layer 120 includes a data staging process, which may further includes three sub-processes, namely, Extract, Transform and Load. These sub-processes are referred to as an ETL process. The Extract sub-process includes extraction of data from different sources and applications. In the present example, sub-process extracts data from includes data sources 112, 114, 116 and 118. The kind and complexity of data sources may vary depending on the nature of computer applications and processes involved. For example, computer systems, network elements, computer databases and other applications may act as data sources. The Transform sub-process involves transformation of data, such as, conversion, aggregation and cleaning of data.

The Load sub-process, generally speaking, involves loading of data at a target location or an intermediate system for further processing. The process may be carried out by a data loader module 122. Data from various sources that are Extracted and Transformed need to be loaded to the data warehouse from the penultimate step of staging in the ETL.

The ETL process results in collection, clean up and conformance of data collected from multiple data sources.

The collected and conformed data is moved into the data warehouse 124 where it is summarized and archived for reporting purposes. The complete data flow process, from data collection to business view of the data may be specified by metadata stored in a metadata repository in the data warehouse 124.

Figure 2:
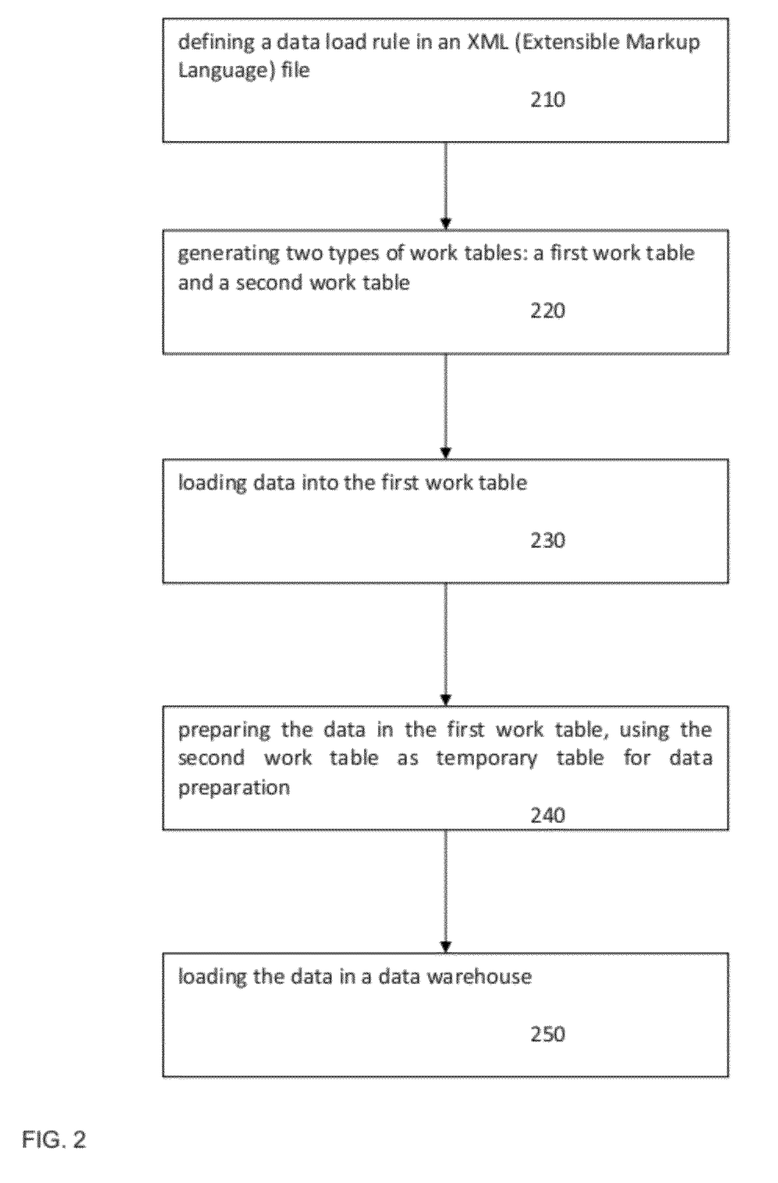
FIG. 2 shows a flow chart of a computer-implemented method of content development for a data warehouse according to an embodiment.

FIG. 2 shows a flow chart of a computer-implemented method of loading data in a data warehouse according to an embodiment.

Step 210 includes defining a data load rule. The data load rule may conform to a data loader model. In an embodiment, the data load rule is defined using an XML (Extensible Markup Language) file, which conforms to the data loader model XSD (XML Schema Definition). A sample non-limiting illustrative code implementing the data loader model XSD is provided below.

```xml
<?xml version="1.0" encoding="utf-8"?>
<xs:schema xmlns:xs="http://www.w3.org/2001/XMLSchema">
    <xs:element name="loadconfig">
        <xs:complexType>
            <xs:sequence>
                <xs:element name="baseTable" type="baseTable" minOccurs="1" maxOccurs="1" />
                <xs:element name="tables" type="tables" minOccurs="1" maxOccurs="1" />
                <xs:element name="references" type="references" minOccurs="0" maxOccurs="1" />
                <xs:element name="associations" type="associations" nillable="true" minOccurs="0" maxOccurs="1" />
                <xs:element name="csvFileSets" type="csvFileSets" minOccurs="1" maxOccurs="1" />
                <xs:element name="loaderOptions" type="loaderOptions" minOccurs="1" maxOccurs="1" />
            </xs:sequence>
        </xs:complexType>
    </xs:element>
    <xs:simpleType name="ScdType">
        <xs:restriction base="xs:string">
            <xs:enumeration value="Type1" />
            <xs:enumeration value="TYPE1" />
            <xs:enumeration value="type1" />
        </xs:restriction>
    </xs:simpleType>
    <xs:simpleType name="TableType">
        <xs:restriction base="xs:string">
            <xs:enumeration value="conformed" />
            <xs:enumeration value="dimension" />
            <xs:enumeration value="fact" />
            <xs:enumeration value="accumulatedSnapShot" />
            <xs:enumeration value="bridge" />
        </xs:restriction>
    </xs:simpleType>
    <xs:simpleType name="DataType">
        <xs:restriction base="xs:string">
            <xs:enumeration value="CHAR_STRING" />
            <xs:enumeration value="COUNTER" />
            <xs:enumeration value="DOUBLE" />
            <xs:enumeration value="ENUM" />
            <xs:enumeration value="FLOAT" />
            <xs:enumeration value="GAUGE" />
            <xs:enumeration value="INTEGER" />
            <xs:enumeration value="NUMERIC" />
            <xs:enumeration value="OCTET_STRING" />
            <xs:enumeration value="TIMETICKS" />
            <xs:enumeration value="TINYINT" />
            <xs:enumeration value="UNIX_TIME" />
            <xs:enumeration value="TIME" />
            <xs:enumeration value="SMALLDATE" />
            <xs:enumeration value="SMALLDATETIME" />
            <xs:enumeration value="VARCHAR" />
            <xs:enumeration value="NUMBER" />
            <xs:enumeration value="char_string" />
            <xs:enumeration value="counter" />
            <xs:enumeration value="double" />
            <xs:enumeration value="enum" />
            <xs:enumeration value="float" />
            <xs:enumeration value="gauge" />
            <xs:enumeration value="integer" />
```

-continued

```
            <xs:enumeration value="numeric" />
            <xs:enumeration value="octet_string" />
            <xs:enumeration value="timeticks" />
            <xs:enumeration value="tinyint" />
            <xs:enumeration value="unix_time" />
            <xs:enumeration value="time" />
            <xs:enumeration value="smalldate" />
            <xs:enumeration value="smalldatetime" />
            <xs:enumeration value="varchar" />
            <xs:enumeration value="varbinary" />
            <xs:enumeration value="VARBINARY" />
            <xs:enumeration value="number" />
        </xs:restriction>
    </xs:simpleType>
    <xs:complexType name="baseTable">
        <xs:attribute name="name" type="xs:string" use="required" />
        <xs:attribute name="loadType" type="TableType" use="required" />
        <xs:attribute name="scdType" type="ScdType" use="optional" />
        <xs:attribute name="isSnapshot" type="xs:boolean" use="optional" />
        <xs:attribute name="checkDuplicate" type="xs:boolean" use="optional" />
    </xs:complexType>
    <xs:complexType name="tables">
        <xs:sequence>
            <xs:element maxOccurs="unbounded" name="table" type="table" />
        </xs:sequence>
    </xs:complexType>
    <xs:complexType name="table">
        <xs:sequence>
            <xs:element name="column" type="column" minOccurs="1" maxOccurs="unbounded" />
        </xs:sequence>
        <xs:attribute name="name" type="xs:string" use="required" />
        <xs:attribute name="type" type="TableType" use="required" />
        <xs:attribute name="primaryTable" type="xs:string" use="optional" />
        <xs:attribute name="masterTable" type="xs:string" use="optional" />
        <xs:attribute name="targetNameColumn" type="xs:string" use="optional" />
    </xs:complexType>
    <xs:complexType name="column">
        <xs:attribute name="name" type="xs:string" use="required" />
        <xs:attribute name="dataType" use="required" type="DataType" />
        <xs:attribute name="len" type="xs:int" use="optional" />
        <xs:attribute name="key" type="xs:boolean" use="required" />
        <xs:attribute name="scdColumn" type="xs:boolean" use="optional" />
        <xs:attribute name="updatable" type="xs:boolean" use="optional" />
        <xs:attribute name="updateKey" type="xs:boolean" use="optional" />
        <xs:attribute name="isAssociationColumn" type="xs:boolean" use="optional" />
        <xs:attribute name="associatedTable" type="xs:string" use="optional" />
        <xs:attribute name="isTimeDimension" type="xs:boolean" use="optional" />
    </xs:complexType>
    <xs:complexType name="associations">
        <xs:sequence>
            <xs:element maxOccurs="unbounded" minOccurs="1" name="association" type="association" />
        </xs:sequence>
    </xs:complexType>
    <xs:complexType name="association">
        <xs:sequence>
            <xs:element maxOccurs="unbounded" minOccurs="1" name="associateMap" type="associateMap" />
        </xs:sequence>
        <xs:attribute name="column" type="xs:string" use="required" />
        <xs:attribute name="referenceTable" type="xs:string" use="required" />
    </xs:complexType>
    <xs:complexType name="associateMap">
        <xs:attribute name="column" type="xs:string" use="required" />
        <xs:attribute name="referenceColumn" type="xs:string" use="required" />
    </xs:complexType>
    <xs:complexType name="references">
        <xs:sequence>
            <xs:element maxOccurs="unbounded" name="referenceTable" type="referenceTable" minOccurs="1" />
        </xs:sequence>
    </xs:complexType>
    <xs:complexType name="referenceTable">
        <xs:sequence>
            <xs:element name="reference" type="reference" minOccurs="1" maxOccurs="unbounded" />
        </xs:sequence>
        <xs:attribute name="name" type="xs:string" use="required" />
    </xs:complexType>
```

-continued

```
<xs:complexType name="reference">
    <xs:attribute name="columnName" type="xs:string" use="required" />
    <xs:attribute name="refTableName" type="xs:string" use="required" />
</xs:complexType>
<xs:complexType name="csvFileSets">
    <xs:sequence>
        <xs:element maxOccurs="unbounded" name="csvFiles" type="csvFiles" />
    </xs:sequence>
</xs:complexType>
<xs:complexType name="csvFiles">
    <xs:sequence>
        <xs:element maxOccurs="unbounded" name="columnMap" type="columnMap" />
    </xs:sequence>
    <xs:attribute name="reconcile" type="xs:boolean" use="required" />
</xs:complexType>
<xs:complexType name="columnMap">
    <xs:sequence>
        <xs:element maxOccurs="unbounded" name="mapTable" type="mapTable" />
    </xs:sequence>
    <xs:attribute name="expression" type="xs:string" use="required" />
    <xs:attribute name="contentPack" type="xs:string" use="required" />
    <xs:attribute name="mapType" type="xs:string" use="required" />
    <xs:attribute name="isTable" type="xs:boolean" use="optional" />
</xs:complexType>
<xs:complexType name="mapTable">
    <xs:sequence>
        <xs:element maxOccurs="unbounded" name="mapColumn" type="mapColumn" />
    </xs:sequence>
    <xs:attribute name="name" type="xs:string" use="required" />
</xs:complexType>
<xs:complexType name="mapColumn">
    <xs:attribute name="tableColumn" type="xs:string" use="required" />
    <xs:attribute name="csvColumn" type="xs:string" use="required" />
</xs:complexType>
<xs:complexType name="loaderOptions">
    <xs:sequence>
        <xs:element maxOccurs="unbounded" name="option">
            <xs:complexType>
                <xs:attribute name="name" type="xs:string" use="required" />
                <xs:attribute name="value" type="xs:string" use="required" />
            </xs:complexType>
        </xs:element>
    </xs:sequence>
</xs:complexType>
</xs:schema>
```

The data load process is driven by the data load rule file (for example, XML file) format) that specifies all the information required to perform the data load process. The load control file (XML format) is processed by a data loader module 122 of the data warehouse 124, which actually loads the data.

It is clarified that the term "module", as used herein, means, but is not limited to, a software or hardware component. A module may include, by way of example, components, such as software components, processes, functions, attributes, procedures, drivers, firmware, data, databases, and data structures. The module may reside on a volatile or non-volatile storage medium and configured to interact with a processor of a computer system.

The data load XML may include the following sections: (1) table section, (2) references and (3) column map section.

(1) The table section includes the structure of tables that needs to be loaded. It includes details like, for example, table name, table type, legacy columns details to update, column details like column name, column type and business key columns.

(2) The references section includes the relationship details between different tables to be loaded. The proposed data loading method supports loading data to association tables which have the sole purpose of linking two or more tables. There is an association section in the loader model that supports it.

(3) The column map section includes the mapping between stage area columns to actual data ware house table columns.

In step 220, the data loader module dynamically generates a set of Work tables based on the data load requirement.

The data in the warehouse are stored in a set of tables organized in schema. In case of star schema, the central table is called the fact table, and the related tables represent dimensions. A row in a fact table usually contains either the value of a measure or a foreign key reference to a dimension table. The row represents the current state of every item covered by the fact table. A dimension table stores the set of values that exist for a given dimension. Dimensions may be shared between different fact tables.

The data loader module creates two types of work tables: a first work table and a second work table.

The first type (the first work table) includes the Work table created for the base table (base table is the table targeted for load. The base table may have star or snow flake type of linkages to other tables). The Work tables will have all the columns of all the tables mentioned in the loader XML file. The data from staging area is first loaded directly to the Work table created for the base table.

The following naming convention may be used in respect of the Work table created for the base table.

Naming: base_reverse of base table name truncated to 25 characters

The second type (the second work table) includes Work table created for tables other than the base table. For each table, other than base table which are linked to the base table, loader module creates work tables of the type temptables. These tables may have all the columns of a data ware house table as specified in the loader XML file.

The following naming convention may be used in respect of the Work table created for the base table.

Naming: temp_base table ID_reverse of table name truncated to 25 characters

In step 230, the data from the staging area is loaded into the Work table of base table (the first work table). In an aspect, loading of data to the base table may take place through a database specific SQL (Structured Query Language) generated dynamically. In another aspect, if data is loaded from a CSV (character-separated values) file, database specific bulk load command is used. For example, sqlldr in case of Oracle and load table command in case of Sybase IQ.

In step 240, the data is prepared for loading in the Work tables (the first work table), using the second work table as temporary table for data preparation. Preparation of data in the Work tables prior to loading of the data into a data warehouse tables ensures consistent data in the data warehouse tables. It may be carried out by performing data insertion from the top level parent in the schema. It also ensures minimal locking of the warehouse tables, resulting in high concurrency support for Insert/Update/Delete operations on warehouse tables.

The data preparation may involve the following steps:

a. Populating Work table with relevant data: This step may involve insertion of data from base work table to a corresponding temp_table (the second work table). Also, the legacy columns of temp_table (the second work table) are updated using business key column values.

b. Duplicate deletion: This step includes checking of duplicates using business key columns. If any duplicates are found, they are deleted.

c. Rounding off of time columns.

d. Surrogate key resolution: In this step, rows are inserted to a data ware house table, if not already existing. This check is done using the business key (BK) column in temp_table (the second work table) and data warehouse table. The surrogate key column of temp_table (the second work table) from DW table is updated with the help of business key (BK) columns.

e. Foreign key resolution: The foreign key reference column of base work table is updated using the surrogate key of temp_table (the second work table).

f. The default values for columns are populated.

Figure 3:
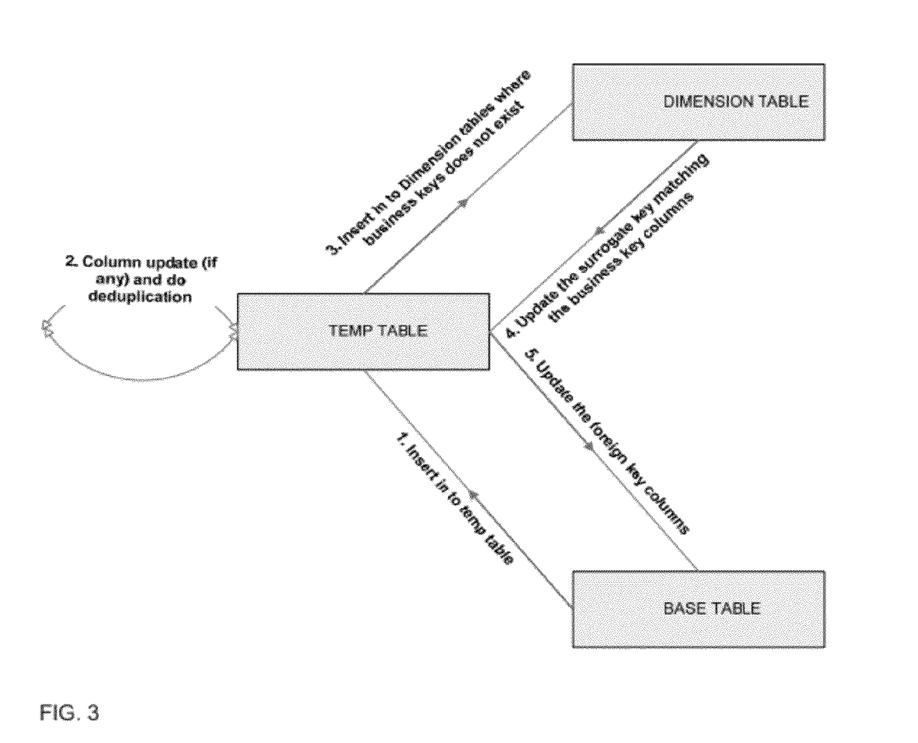
FIG. 3 shows a top level view of a data preparation step.

A top level overview of the data preparation step is provided in FIG. 3.

In step 250, the data prepared in the Work tables (the first work table) is moved to the data warehouse tables. In an aspect, the data is moved using a dynamically generated stored procedure which is optimized for the database type. Also, wherever possible, the data movement to data warehouse is carried in bulk mode.

Figure 4:
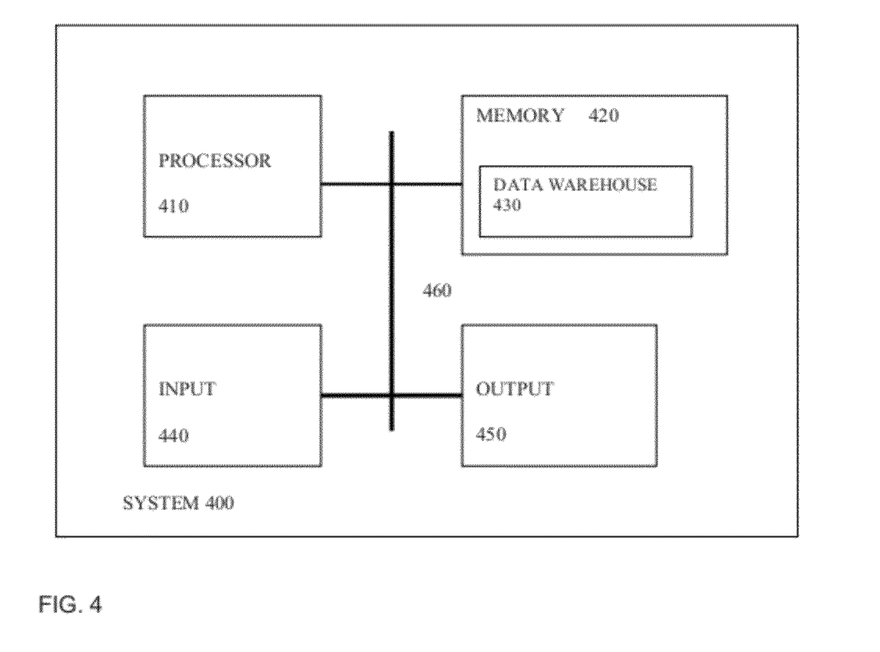
FIG. 4 shows a block diagram of a computing system according to an embodiment.

FIG. 4 shows a block diagram of a computing system according to an embodiment.

The system 400 may be any kind of computing device, such as, but not limited to, a personal computer, a desktop computer, a laptop computer, a notebook computer, a network computer, a personal digital assistant (PDA), a mobile device, a hand-held device, or any other suitable computing. Further, the system 400 may be a standalone system or a network system (such as, but not limited to, a client/server architecture) connected to other computing devices through wired or wireless means.

The system 400 may include a processor 410, for executing machine readable instructions, a memory 420, for storing a data warehouse 430, an input device 440 and an output device 450. These components may be coupled together through a system bus 460.

The processor 410 is arranged to generate a data warehouse based on input data and a data load rule defined in an XML file received via the input device 440, and to store the data warehouse 430 in the memory 420. The processor 410 is further arranged to execute machine readable instructions stored in the memory 420. The machine readable instructions comprises: a data loader module to generate two types of work tables: a first work table and a second work table; to load data into the first work table; to prepare the data in the first work table, using the second work table as temporary table for data preparation; and to load the data in the data warehouse 430.

The memory 420 may include computer system memory such as, but not limited to, SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. The memory 420 stores the data warehouse 430.

The input device 440 may include a mouse, a key pad, a touch pad or screen, a voice recognizer, and the like, for providing input data and a data load rule defined in an XML file.

The output device 450 may include a Virtual Display Unit (VDU), a printer, a scanner, and the like, for displaying contents of the data warehouse 430.

It would be appreciated that the system components depicted in FIG. 4 are for the purpose of illustration only and the actual components may vary depending on the computing system and architecture deployed for implementation of the present solution. The various components described above may be hosted on a single computing system or multiple computer systems, including servers, connected together through suitable means.

The embodiments described provide an efficient model driven mechanism of loading data in a data warehouse. The embodiments support loading of data to different schema models. They also support loading different types of dimension data and fact data. The embodiments are extensible to support new data warehouse and database support requirements. They also support management of corner case scenarios like null business keys and duplicate data.

It will be appreciated that the embodiments within the scope of the present solution may be implemented in the form of a computer program product including computer-executable instructions, such as program code, which may be run on any suitable computing environment in conjunction with a suitable operating system, such as, Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present solution is for the purpose of illustration only. Although the solution has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present solution.

The invention claimed is:

1. A computer-implemented method of data loading in a data warehouse, comprising:
   generating two types of work tables comprising a first work table and a second work table, wherein the second work table is a temporary table for data preparation;
   loading data into the first work table;
   preparing the data in the first work table for loading into the data warehouse, wherein preparing the data includes:
      inserting data from the first work table into the second work table;
      updating legacy columns of the second work table using business key column values;
      deleting duplicates within the second work table using a business key column in the second work table;
      updating a surrogate key column of the second work table using business key columns in the data warehouse and the second work table; and
      updating foreign key reference column of the first work table using the updated surrogate key of the second work table; and
   loading the prepared data in the data warehouse.

2. The method according to claim 1, wherein the first work table is a work table created for a base table.

3. The method according to claim 2, wherein the second work table is a work table created for a table linked to the base table.

4. The method according to claim 3, wherein at least one second work table is created for each table linked to the base table.

5. The method according to claim 1, wherein preparing the data in the first work table further comprises: rounding off of time columns and populating default values for columns.

6. The method according to claim 1, further comprising, prior to generating two types of work tables, defining a data load rule in an XML (Extensible Markup Language) file, wherein the XML file includes three sections: a table section, a references section and a column map section.

7. The method according to claim 6, wherein the first table includes all columns of all tables included in the table section in the XML file.

8. A system, comprising:
   a processor and a memory;
   a data loader module, implemented by the processor, which:
      generates two types of work tables comprising a first work table and a second work table, wherein the second work table is a temporary table for data preparation;
      loads data into the first work table;
      prepares the data in the first work table for loading into a data warehouse stored in the memory, wherein to prepare the data, the processor performs:
         inserting data from the first work table into the second work table;
         updating legacy columns of the second work table using business key column values;
         deleting duplicates within the second work table using a business key column in the second work table;
         updating a surrogate key column of the second work table using business key columns in the data warehouse and the second work table; and
         updating foreign key reference column of the first work table using the updated surrogate key of the second work table; and
      loads the prepared data in the data warehouse.

9. The system according to claim 8, wherein the first work table is a work table created for a base table and the second work table is a work table created for a table linked to the base table.

10. A non-transitory machine-readable medium comprising instructions to implement a method of loading data into a data warehouse, wherein the instructions, when executed by a processor, cause the processor to perform:
   generating two types of work tables comprising a first work table and a second work table, wherein the second work table is a temporary table for data preparation;
   loading data into the first work table;
   preparing the data in the first work table for loading into a data warehouse stored in the memory, wherein to prepare the data, the processor performs:
      inserting data from the first work table into the second work table;
      updating legacy columns of the second work table using business key column values;
      deleting duplicates within the second work table using a business key column in the second work table;
      updating a surrogate key column of the second work table using business key columns in the data warehouse and the second work table; and
      updating foreign key reference column of the first work table using the updated surrogate key of the second work table; and
   loading the prepared data in the data warehouse.

* * * * *